July 18, 1933. C. OTTO 1,918,926
REGENERATIVE COKE OVEN
Filed May 29, 1929
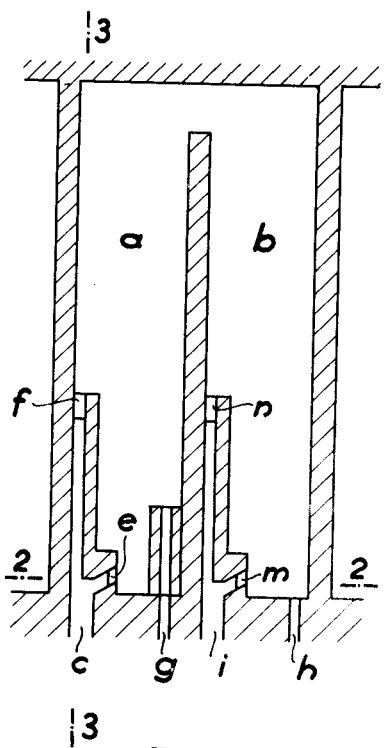
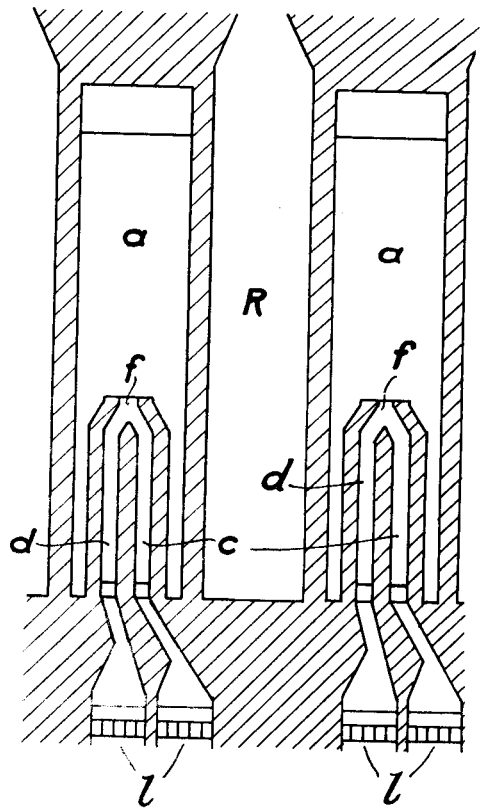
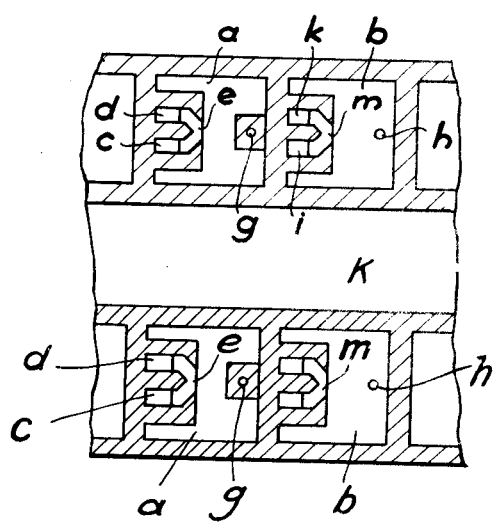
INVENTOR
Carl Otto
BY
W. F. Bissing
ATTORNEY Patented July 18, 1933

1,918,926

UNITED STATES PATENT OFFICE

CARL OTTO, OF ESSEN-RUHR, GERMANY

REGENERATIVE COKE OVEN

Application filed May 29, 1929, Serial No. 366,993, and in Germany May 29, 1928.

My invention relates to regenerative coke ovens adapted to be heated selectively by strong, weak or mixed gas, i. e. coke oven gas, producer gas, or a mixture thereof.

It is known in heating coke ovens to introduce the air in the heating flues at the bottom thereof or at top from the oven cover, and to supply the gas through passages provided in the walls of the heating flues which passages may branch out like a fork, or through independent tubular passages arranged in the heating flue and opening thereinto at different levels. In this case the gas thus enters the air-fed heating flue at several places of different level. Inversely, the gas may be supplied at the lower end of the heating flues whilst the air is introduced through passages arranged within the walls of the flues or through special ducts that open into the flue at different levels. In this case it is the air which enters the gas-fed flue at several places of different level. Now it appeared that with this manner of heating a less uniform and incomplete combustion is obtained, owing to closed gas currents being formed within the air or closed air currents within the gas, the combustion taking place only along the zone of contact of said two agents.

According to my invention which relates to the above-mentioned regenerative coke oven adapted to be heated selectively by strong, weak, or mixed gas and in which the strong gas is supplied at the floor of the heating flue or through one or more conduits projecting into the flue, these drawbacks are obviated by air and weak gas being so fed through a twin conduit which has one or more inlets at different levels within the flue that a mixing of the two agents takes place before they enter the flue. The open area of the individual conduits and outlets may be so determined that the quantities leaving the inlets remain equal relatively to one another even if the whole quantity of the agents supplied in the time unit is varied. The strong gas feeding conduits may be arranged either at the same level above the floor of the flues or staggered in such a manner that the conduits appertaining to the even-numbered flues open thereinto at a lower level whilst the conduits of the odd-numbered flues open thereinto at a higher level. To accelerate combustion, baffle means may be arranged in the vicinity of the inlets of the air-gas mixture which means e. g. may consist in lugs, shoulders, or grooves arranged in the walls of the flues. The outlet ports for the weak gas and the air may be situated below those of the strong gas.

In order that my invention can be more easily understood, a preferred embodiment of the same is illustrated by way of example in the accompanying drawing, in which a twin flue oven is shown.

Figure 1 is a vertical section through an ascending and a descending heating flue of a coke oven of the type mentioned, Figure 2 is a section on line 2—2 of Figure 1, and Figure 3 is a section on line 3—3 of Figure 1.

Referring to these figures, the heating walls, between which the coking chamber R is located, comprise vertical combustion flues of which $a$ denotes for example, an ascending heating flue in which is arranged the strong gas conduit $g$ having a tubular extension, and further the weak gas conduit $c$ and air conduit $d$. The weak gas conduit $c$ and air conduit $d$ form a twin conduit and open by the common duct $e$ into the heating flue $a$ adjacent the floor and on the top thereof by the common duct $f$. In the descending flue $b$ is arranged the strong gas conduit $h$ and the weak gas conduit $i$ and air conduit $k$. The two latter conduits form a twin conduit and open by the common duct $m$ into the flue adjacent the floor and by the common duct $n$ into the top portion thereof. Upon reversal $b$ becomes the ascending and $a$ the descending flue. The weak gas and air conduits of the flues are supplied with preheated gas and preheated air from regenerators 1.

The chief advantage of my invention resides in the fact that a much better and more uniform combustion is obtained by the mixing of the agents, before entering the heating flue. Furthermore, the arrangement of the described twin conduits results in a more robust construction of the nozzles than could be obtained with the single conduits hitherto used.

What I claim and desire to secure by Letters Patent, is:—

1. In a regenerative coke oven having an oven chamber and contiguous heating walls comprising vertical combustion flues, a pair of conduits arranged side by side and extending within each of said flues, one conduit of each of the pairs being adapted to supply preheated air and the other of each of said pairs being adapted to supply preheated gas, the conduits of each of said pairs each opening into a plurality of common mixing inlet ducts arranged at different levels above the bottom and communicating with each of said flues, and another conduit communicating with each flue and adapted to supply an alternative fuel gas thereto.

2. In a regenerative coke oven having an oven chamber and contiguous heating walls comprising vertical combustion flues, three supply conduits for each flue, a pair of said conduits being arranged side by side in and at one side of each flue, one conduit of each of the pairs being adapted for supplying preheated air and the other conduit of each of the pairs being adapted to supply preheated gas, the conduits of each of said pairs each opening into a plurality of mixing inlet ducts communicating with each flue at different levels above the flue bottom, one of said inlet ducts in each flue projecting laterally, and the third conduit of the three supply conduits for each of the flues being in each flue adapted to supply an alternative fuel gas thereto.

3. In a regenerative coke oven having an oven chamber and contiguous heating walls comprising vertical combustion flues, three supply conduits for each flue, a pair of said conduits being arranged side by side in and at one side of each flue, one conduit of each of the pairs being adapted for supplying preheated air and the other conduit of each of the pairs being adapted to supply preheated gas, the conduits of each of said pairs each opening into a plurality of mixing inlet ducts communicating with each flue at different levels above the bottom of the flues, one of said inlet ducts in each flue projecting laterally, the third conduit of the three supply conduits for each of the flues communicating with each flue at the opposite side and adapted to supply an alternative fuel gas thereto, the third conduit in one flue being arranged at a higher level than the third conduit in a neighboring flue.

CARL OTTO.